Figure 1:
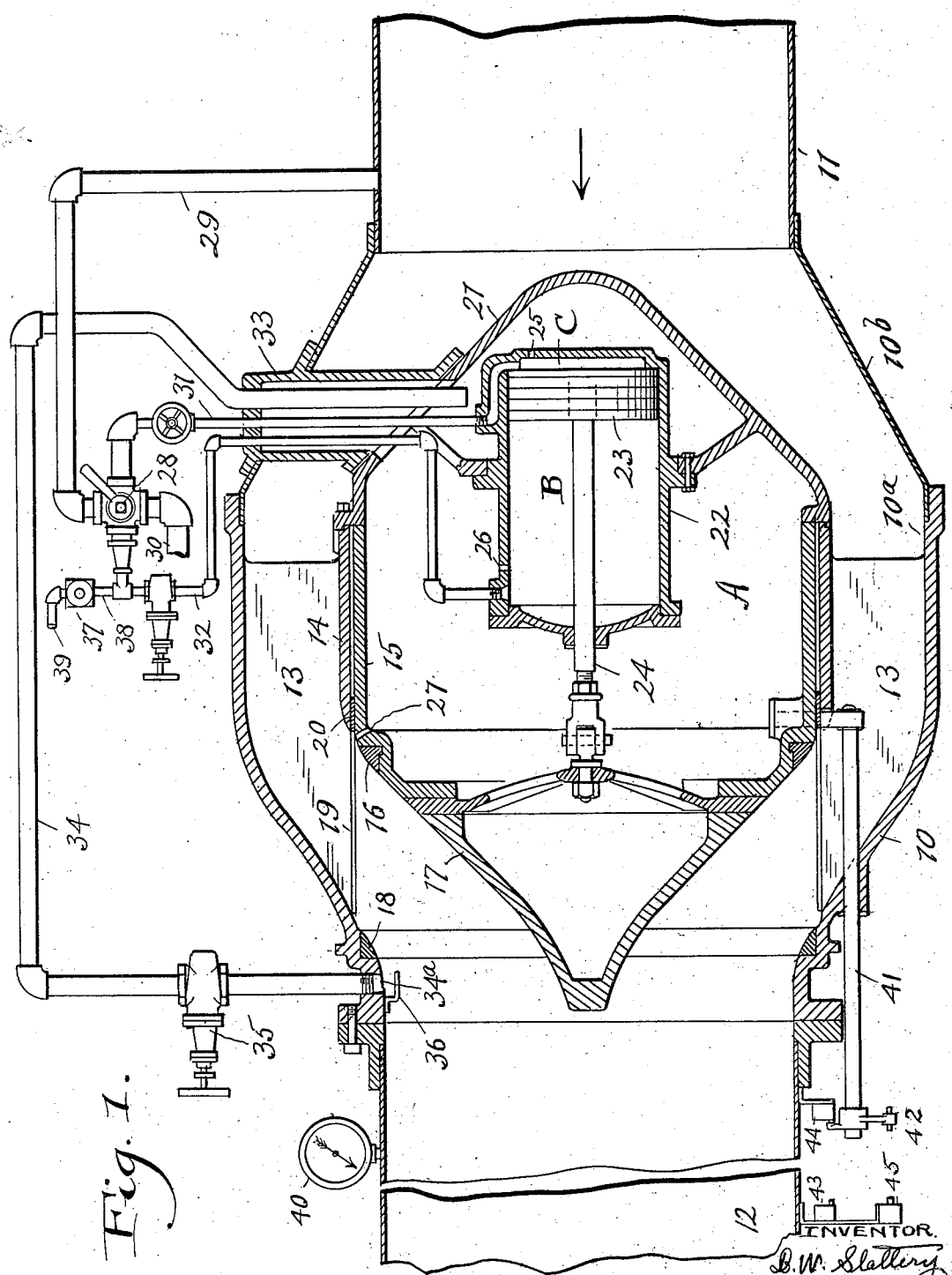

Feb. 19, 1924.  
D. W. SLATTERY  
VALVE  
Filed June 1, 1920  
1,483,991  
2 Sheets-Sheet 1

INVENTOR.  
D. W. Slattery  
by Thurston Bates & Hudson  
Attys.

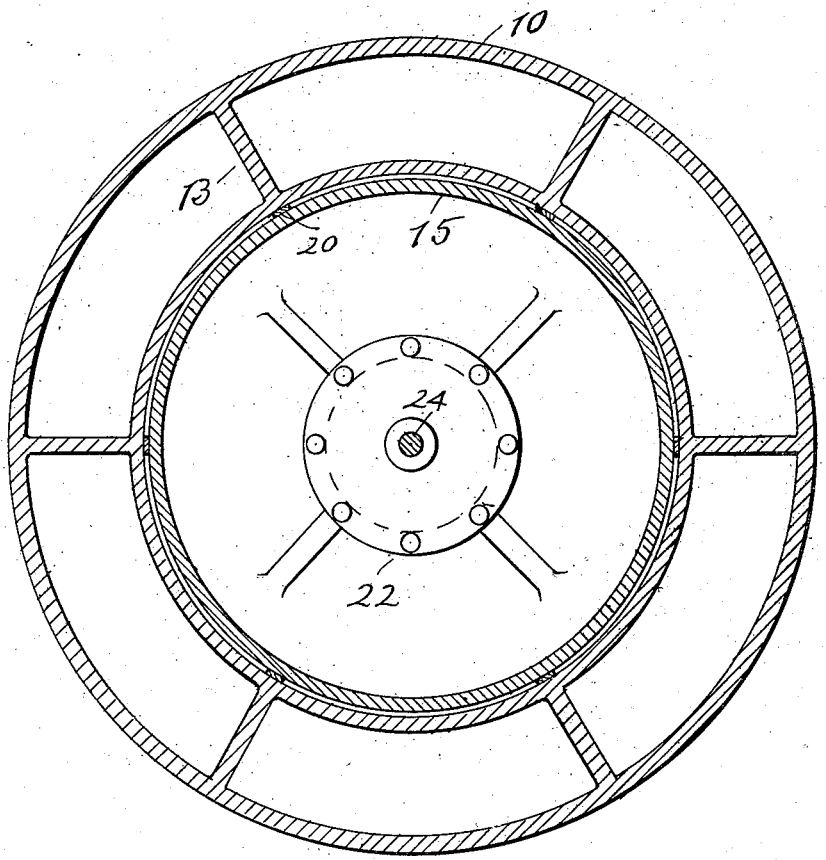

Patented Feb. 19, 1924.

1,483,991

UNITED STATES PATENT OFFICE.

DONALD W. SLATTERY, OF EAST CLEVELAND, OHIO, ASSIGNOR TO THE WELLMAN-SEAVER-MORGAN COMPANY, OF CLEVELAND, OHIO, A CORPORATION OF OHIO.

VALVE.

Application filed June 1, 1920. Serial No. 385,684.

*To all whom it may concern:*

Be it known that I, DONALD W. SLATTERY, a citizen of the United States, residing at East Cleveland, in the county of Cuyahoga and State of Ohio, have invented a certain new and useful Improvement in Valves, of which the following is a full, clear, and exact description.

This invention relates to valves, particularly hydraulic valves of the pressure operated plunger type. Hydraulic valves are commonly employed at the present time having plungers which are moved to open and closed positions by admitting pressure to one of two chambers and exhausting pressure from the other, these chambers being usually called the opening and closing chambers. Some of these valves are not satisfactory in all respects and are open to serious objection, particularly when operated under comparatively high heads.

One of the principal objections is the tendency for the valve to close suddenly as the plunger is nearing the end of its closing stroke, due to the sudden termination of pressure on the nose of the valve opposing the pressure in the closing chamber. When the valve is being closed, pressure is supplied to the closing chamber and exhausted from the opening chamber, and the effective force which moves the plunger to closed position is the difference between the total pressure in the closing chamber and the pressure of the water acting on the nose of the valve, but this opposing pressure on the nose of the valve is a variable quantity, for as the plunger approaches its seat, due to a restriction of the discharge opening there will be an increase in velocity of water past the plunger, and consequently a drop in pressure on the nose of the plunger, or a reduction of the force opposing the force in the closing chamber, which latter is constant. Near the termination of the stroke of the plunger, the plunger restricts the area of the discharge opening to a point such that sufficient water no longer passes through the valve to fill the pipe line beyond the valve, and this will result in a break in the water column and the production of a vacuum on the nose side of the plunger. Thus the force on the nose of the plunger which has been resisting the closing movement suddenly attains a negative value and the vacuum tends to pull the plunger to its seat, thus adding an additional force to the closing force. In consequence, the plunger will complete the last quarter inch or or half inch of its stroke almost instantly, causing water hammer which under extremely high head is dangerous.

Another objection to some of these valves lies in the fact that under certain conditions the valve plunger has a tendency to creep to closed position. For example, it is desirable, and in fact, necessary under high pressure conditions that the valve be "by-passed," that is to say, it is necessary that the valve be opened very slightly so as to allow the pipe beyond the valve to slowly fill with water before the valve is fully opened. To do this the control valve is moved from neutral to the open position and then when the valve is "cracked" it is returned to the neutral position. But pressure builds up in the closing chamber due to leakage, and the high velocity of the water around the nose of the plunger offers practically no force to oppose the force in the closing chamber, and as a result the valve will close before the by-passing is completed.

Furthermore, when the valve is opened after the completion of the by-passing, there is often a tendency for the plunger to creep shut, due to a change in pressure on the nose of the plunger by an increase in velocity.

By the present invention I provide what may be termed a balanced plunger valve which overcomes the objections above enumerated.

The invention may be said to consist in the provision of means by which pressure on opposite sides of the nose of the plunger is equalized so that any variation of the pressure acting on the nose of the plunger will have no effect on its action, the result being that the plunger will be moved at a constant rate as long as a constant force is applied, and if the force is removed with the plunger in position other than full open or full closed position it will remain in that position just as effectively as if the plunger were in dead or still water until force is again applied to cause the valve to complete its stroke.

The invention may be further briefly summarized as consisting in certain novel details of construction, and combinations and arrangements of parts which will be described in the specification and set forth in the appended claims.

In the accompanying sheets of drawings I have shown a construction which answers the requirements very effectively, and in the drawings, Fig. 1 is a longitudinal sectional view taken substantially centrally through the valve; and Fig. 2 is a transverse sectional view through the valve.

The valve here shown, comprises a casing 10. circular in cross-section and adapted to be connected at its ends to pipes 11 and 12, the flow of water being in this instance in the direction indicated by the arrow in Fig. 1, i. e. from pipe 11 through the valve chamber to pipe 12.

Both the inlet and outlet ends of the casing, 10 may be of the same diameter as in this instance, or if desired, one end of the casing may be larger than the other. Furthermore, the casing may be formed wholly of castings, or as in this instance, partly by a casting and partly from sheet metal, the casing in this case being composed of a body portion 10$^a$ in the form of a casting and having its inlet end 10$^b$ formed from sheet or rolled steel.

Cast integrally with the body portion of the casing and connected to the annular wall thereof by radial ribs 13 (see particularly Fig. 2) is an internal cylinder 14, which contains a sliding valve or valve plunger 15. A seat ring 16 is machined or inserted on the conical end or nose 17 of the plunger, which ring is located as near as possible to the outside cylindrical wall of the plunger. The seat ring 16 is designed to engage with a similar seat ring 18 machined or inserted in the valve body at the neck or outlet end. The plunger is guided on liners 19 on the radial ribs 13, and on a continuous liner 20 at the front end of the cylinder 14.

Bolted to the back end of the cylinder 14 is a conical head 21 which with the cylinder 14 and plunger 15, form a central closed space or chamber A. The continuous liner 20 over which the plunger slides, as heretofore stated, forms a seal between the chamber A and the water passage of the valve body.

In the internal chamber A and bolted to the head 21 of the valve is a cylinder 22 containing a piston 23 connected to the plunger by means of a connecting rod 24. The piston divides the cylinder into two chambers which may be designated B and C, the former being the opening chamber and the latter the closing chamber. Both these chambers communicate with the central chamber A by small ports 25 and 26, and it may be here stated that the chamber A communicates with the main water-way in the valve chamber by a port 27, the function of which will be explained presently.

To control the supply to and exhaust of pressure from the chambers B and C, any suitable control valve may be made use of. For example, the control valve may be of the type shown in my application, Serial No. 374,671, filed April 17, 1920, for valve control, if electrical operation is desired, or if hand operation only is desired, a simple four-way valve such as indicated conventionally at 28 may be utilized. Pressure is supplied to the valve 28 from the pipe line 11 by a pipe 29, and from the chamber of the valve 28 there extends a pipe 30 for exhausting to atmosphere. Likewise the chambers of the valve 28 are connected to the chambers B and C of the cylinder 22 by two pipes 31 and 32, both of which extend from the outside of the valve casing to the central chamber A through a suitable header 33.

When the valve 28 is in neutral position, the passage of water through pipes 31 and 32 is prevented. When the valve handle is moved in one direction from neutral position, pressure is supplied to chamber C and exhausted from chamber B so as to cause the main valve to close, and when the handle of the four-way valve 28 is moved to another position, pressure is supplied to chamber B and exhausted from chamber C.

To attain the chief object of this invention, i. e. to at all times maintain the same pressure on the inner side of the valve plunger as exists on the nose of the plunger, I provide what may be termed an equalizing pipe 34 which is connected at 34$^a$ to the neck of the valve just beyond the seat 18, and is also connected to the central chamber A, this pipe extending through the header 33 already referred to. This pipe 34 is preferably provided with a shut-off valve 35, though this valve is normally open so that it will maintain the equalization of pressure on opposite sides of the nose of the plunger. A deflector 36 may be provided over the port 34$^a$ so that the precise pressure which exists at the neck of the valve chamber will be communicated to the interior of the plunger.

For the automatic control of the main valve I prefer to employ certain additional apparatus which per se are not claimed herein, but which are fully disclosed in my prior application referred to above. For example, I may employ a solenoid operated valve, indicated conventionally at 37, which valve has a connection 38 with the pipe 32 and a pipe 39 which will exhaust to atmosphere, and I prefer to employ a pressure guage 40 which is connected to the pipe line 12 beyond the valve and will have its contacts so set that if the pressure in the line beyond the main valve is reduced to a certain value, as by breakage in the line beyond the valve, this pressure guage will cause the energization of the solenoid of valve 37 which will cause pressure to be exhausted from chamber B, and as the pressure will gradually build up in chamber C by the passage of water through the port 25, the plunger will be slowly moved to closed position.

Additionally I prefer to provide an indicator rod 41 which is connected to the plunger 15, and provided at its outer end with an arm 42 which operates two switches 43 and 44 adapted to close the circuit through lamps or equivalent indicating means to indicate the closed and open positions of the valve plunger. Likewise this arm 42 is adapted to open a normally closed limit switch 45 just before the plunger seats, which limit switch will be wired up to the solenoid of valve 37, so that just before the main valve seats, the solenoid will be de-energized for the purpose fully described in my prior application.

The operation is as follows: Assuming the main valve to be open with the direction of flow as shown, there will be the same pressure in the central chamber A and also in chambers B and C of the inner cylinder as that acting on the nose of the plunger, due to the equalizing pipe 34. The control valve will now be in neutral position with all ports closed. It is obvious that since pressure on the nose of the plunger is equal to the pressure in the central chamber, to move the plunger, only sufficient force must be exerted to overcome friction of the plunger sliding on the guides. In other words, the plunger may be said to be lying in dead water. In order to close the main valve the control valve will be operated to exhaust pressure from chamber B and admit pressure to chamber C. The plunger 15 will then start to move through its stroke. As the discharge passage for the water in the valve casing is gradually reduced in area by the closing movement of the valve plunger 15, the pressure on the nose of the plunger will be gradually reduced, but whatever pressure exists on the nose of the plunger will be communicated by the pipe 34 to the central chamber A, and in consequence the rate of movement of the plunger will be constant. As the plunger nears its seat, a vacuum will form in the line beyond the valve as already described, but through the provision of the equalizing pipe 34 the vacuum will be communicated to the central chamber A so that the enormous closing force which has heretofore existed is avoided, and in consequence the plunger will quietly seat without the instantaneous or sudden closing which is so dangerous with some types of valves, especially when used under high head conditions.

It will be readily seen that as the plunger reaches a certain point in its stroke, such that the pressure in the down-stream pipe 12 drops to the predetermined value at which the contacts of the pressure gauge have been set, the gauge will energize the solenoid and open the valve 37 to discharge to atmosphere, exhausting chamber B which also is open to exhaust by means of the control valve 28. This does not, therefore, affect the closing operation of the main valve under normal conditions. As the valve about seats, the limit switch 45 will cause the de-energization of the solenoid of valve 37, and the valve 37 will return to its seat and the flow from chamber B through 37 will be stopped. When the main valve is seated, the control valve will be returned to neutral position, stopping the passage of water through pipes 31 and 32.

It might be mentioned at this point, that the port by which pipe 32 communicates with the chamber B of the inner cylinder 22, is so located that this port will be partly closed by the piston just before the valve plunger seats, so that a cushioning effect will be had.

If a dry line is desired beyond the plunger of the main valve, when the latter is closed, it is only necessary to close the valve 35, in which event pressure will build up in the central chamber, creating an enormous closing force which will tightly seat the valve, making it practically what is known as a drop tight valve. However, valve 35 in the equalizing pipe 34 must be opened before the plunger of the main valve can be opened.

Assuming the main valve to be closed, to open the valve the control valve 28 will be turned to admit pressure to chamber B and exhaust pressure from chamber C of the inner cylinder 22. The main valve plunger 15 will then start through its opening stroke, and when it has moved about one-eighth or one-quarter of an inch, depending upon the adjustment, the limit switch 45 will close and energize the solenoid of the solenoid valve 37 which will exhaust pressure from chamber B into which the control valve is admitting pressure. Since the equalizing pipe 34 maintains the same pressure conditions on both sides of the plunger 15, it is evident that the plunger 15 will stop. Water will then slowly fill the pipe line beyond the main valve up to the predetermined point at which the contact making pressure gauge 40 is set. When this point is reached the contacts will break the circuit of the solenoid of valve 37, and the valve 37 will close, cutting off the exhaust of water from B, and when this occurs, the plunger will continue its opening movement since the control valve is now admitting pressure to chamber B. This may be called automatic by-passing, which is fully claimed in my prior application.

The ports 25 and 26 communicating with the chambers B and C of the cylinder 22, are smaller than the port openings by which the pipes 31 and 32 communicate with these chambers, the function of the ports 25 and 26 being to allow the escape of any air which may be carried into the chambers B and C, and the port 25 serving to permit pressure to build up in chamber C so as to cause the closure of the main valve should the pressure beyond the main valve drop to the point such that the pressure gauge causes the energization of the solenoid of valve 37, and the exhaust of pressure from chamber B of the cylinder. The port 27 is simply an air hole to allow the escape of any air which is in the central chamber.

It will be seen from the above, that by maintaining the same pressure on the inner and outer sides of the nose of the plunger of the main valve, the objectionable characteristics heretofore mentioned of pressure operated plunger valves as heretofore generally constructed and operated, are entirely overcome, and it will be apparent also that the provision of the equalizing pipe or other means to cause the equilization of pressure on the inner and outer sides of the nose of the plunger can be employed advantageously with valves which are constructed and operated differently than that here shown, and I therefore do not desire to be confined to any details of construction and arrangement except to the extent required by the terms of the appended claims.

Having described my invention, I claim:

1. In combination with a conduit, a valve comprising a casing, a hollow member within the casing having a plunger, means for shifting said plunger to open and close the valve, and means independent of the means for opening and closing the valve and extending to the exterior of the valve for maintaining within said hollow member substantially the same pressure that exists on the nose of the plunger.

2. In combination with a conduit and a valve therein comprising an outer casing and an inner hollow member with a movable part constituting a plunger, of means extending to the exterior of the casing for maintaining substantially the same pressure in said hollow member as exists on the nose of the plunger, and separate means for opening and closing the valve.

3. In combination with a conduit, a valve therein comprising a casing, an inner hollow member having a stationary part and a movable part constituting a plunger adapted to be shifted to open and close the valve, means for opening and closing the valve, and an equalizing pipe communicating with the interior of said hollow member through the stationary part thereof and with a point in the water-line outside said hollow member so as to maintain within said member substantially the same pressure as exists on the nose of the plunger regardless of whether the plunger is stationary or is being moved in either direction.

4. In combination with a conduit through which a fluid is adapted to be conducted, of a valve in the conduit comprising a casing having a seat, a hollow member within the casing having a plunger adapted to be moved to and from the seat to close and open the valve, pressure operated means to open and close the valve, and means independent of said pressure operated means and extending to the exterior of the casing for maintaining substantially the same pressure within said hollow member and on the inner side of the plunger as exists at a definite point in the water line adjacent the seat.

5. In combination with a conduit through which a fluid is adapted to be conveyed, of a valve in the conduit comprising a casing having a seat, a hollow member supported within the casing and having a movable part in the form of a plunger adapted to be shifted to and from the seat to close and open the valve, opening and closing chambers to which pressure is adapted to be supplied and from which pressure is adapted to be exhausted to cause the opening and closure of the valve, and a stationary passageway communicating at one end with the chamber, and communicating at its other end with the water way by which the pressure on the outer end of the plunger is maintained on the inner side of the hollow member.

6. In combination with a conduit through which a fluid is adapted to be conveyed, of a valve in the conduit comprising a casing having a seat, an inner hollow member with a movable part in the form of a plunger adapted to be moved to and from the seat, means for shifting the plunger to open and close the valve, and an equalizing pipe wholly independent of the opening and closing means extending between said hollow member and a point in the water line beyond the seat, whereby the pressure on the nose of the plunger is communicated to the interior of said hollow member.

7. In combination with a fluid conduit, a valve in the conduit comprising a casing, an inner hollow member having a movable part in the form of a plunger, means for shifting the plunger in one direction to open the valve and in the opposite direction to close the valve, an equalizing passageway communicating with the interior of the hollow member and with the water-way for maintaining within the hollow member during both the opening and closing movements of the plunger substantially the same pressure that exists on the nose of the plunger, and means for opening and closing said passageway.

8. In combination with a conduit, a valve therein comprising an outer casing and an inner hollow member with a movable part constituting a plunger, means for actuating said plunger to open and close the valve, and a stationary passageway communicating with the interior of the valve and with the water-way and serving to maintain within the hollow member substantially the same pressure as exists on the nose of the plunger regardless of the position of the latter or its direction of movement, and a valve for opening and closing said passageway.

In testimony whereof, I hereunto affix my signature.

DONALD W. SLATTERY.